United States Patent [19]

Yasuda et al.

[11] Patent Number: 4,703,347
[45] Date of Patent: Oct. 27, 1987

[54] INDIVIDUALITY DISCRIMINATING SYSTEM

[75] Inventors: Akira Yasuda, Neyagawa; Kazuhisa Akiyama, Hirakata; Toshinari Nakao, Ikoma; Hiroyoshi Yuasa, Hirakata, all of Japan

[73] Assignee: Matsushita Electric Works, Ltd., Osaka, Japan

[21] Appl. No.: 840,747

[22] Filed: Mar. 18, 1986

[30] Foreign Application Priority Data

Mar. 25, 1985 [JP] Japan .................................. 60-60002

[51] Int. Cl.$^4$ .............................................. H04N 7/18
[52] U.S. Cl. .................................... 358/102; 358/133; 358/93; 358/108
[58] Field of Search .................... 358/102, 93, 96, 133, 358/108, 105, 85, 256; 235/380-382; 360/2

[56] References Cited

U.S. PATENT DOCUMENTS

| | | | |
|---|---|---|---|
| 3,564,132 | 2/1971 | Baker et al. | 358/108 |
| 3,701,100 | 10/1972 | Yarbrough | 358/108 X |
| 3,943,335 | 3/1976 | Kinker et al. | 358/93 X |
| 3,943,563 | 3/1976 | Lemelson | 358/102 X |
| 4,546,383 | 10/1985 | Abramatic et al. | 358/96 X |
| 4,554,591 | 11/1985 | Kee | 360/2 X |

FOREIGN PATENT DOCUMENTS 56-17465 2/1981 Japan .

Primary Examiner—James J. Groody
Assistant Examiner—Victor R. Kostak
Attorney, Agent, or Firm—Burns, Doane, Swecker & Mathis

[57] ABSTRACT

An individuality discriminating system wherein analog signals of a human individual picture are converted to digital signals according to brightness of the picture, and such digital signals are stored as individual picture data in an integrated-circuit (IC) card as compressed, with picture elements other than changed ones in the picture treated as zero picture elements, while in using the IC card by its bearer the thus stored data are read out of the card as expanded and analog-converted for display on a monitor. Since the picture data are compressed to remarkably reduce code volume upon the storing in the card, the individuality discrimination can be realized practically precisely and effectively reliably through an investigators's comparison with eyes of the thus displayed picture with a directly viewed or monitored picture of the bearer.

4 Claims, 3 Drawing Figures

INDIVIDUALITY DISCRIMINATING SYSTEM

TECHNICAL BACKGROUND OF THE INVENTION

This invention relates to an individuality discriminating system employing an integrated-circuit (IC) card and, more particularly, to a system in which picture data of a card-bearing individual are stored in the IC card and, in using the card for identification purposes, the picture data are read out of the card and monitored for visual comparison by an investigator of the monitored picture with directly monitored picture of the individual himself.

This individuality discriminating system is useful in providing a precise personal identity recognition, when the IC card of the system is utilized as a credit card, cash card (for use with automatic cash drawing/depositing machines at banks), or the like which is employed in any other system requiring the identity recognition.

DISCLOSURE OF PRIOR ART

In the system employing the card of the kind referred to for transactions, generally, a specific code such as a personal identification number is recorded by a magnetic means in the card and, in using the card, the system allows the transaction to proceed automatically when, for example, the code manually given by the user to the system conforms to the code read out of the card. In this case, there arises a problem that a person other than the bona fide card-user may get the card and use it with the code stealthily read out of the card, and a demand has been to improve the system in this respect.

To eliminate the problem, there has been suggested, for example, in Japanese Patent Appln. Laid-Open Publication No. 56-17465 (1981) by A. KAWAGUCHI a system wherein, in addition to the specific code magnetically recorded in the card as has been known, picture data of the card-bearer's face is stored on the card. In this case, the picture data are stored by monitoring the bearer's face, photoelectrically converting picture elements of the monitored image into electrical signals and then converting the electrical signals into binary data according to light and shade of the picture elements. Upon each use of this card, on the other hand, the bearer's face is directly monitored simultaneously with a code and data reading operation out of the card, picture elements of the directly monitored face picture are converted also to the binary data through the same steps as in the case of storing the face picture data on the card, and the directly monitored binary data are compared by a comparator with the stored binary data for recognition of the identity of the bearer.

This system of the Japanese publication has been an improvement in achieving a more reliable identity recognition than the known systems employing the card having only the specific code. However, the card used in the system referred to is nearly of the same size as that of playing cards and the storage capacity of the card is limited to be a bar to an incremental storing of required data for any higher precision identity recognition. In other words, realization of the higher precision identity recognition calls for a remarkable increase in the face picture elements to an extent of about 256×256, exceeding largely the storage capacity of the card, and the realization is practically difficult. Yet, the increased number of the face picture elements causes another problem to arise in inherent complication and enlargement of such discriminating means as the comparator that render the manufacturing costs to become high. In addition, since the human face often greatly changes due to emotion or a like factor, there is a risk that such higher precision discrimination requiring the comparator or the like may cause frequent errors. For this reason, it has been demanded to realize a reliable discriminating system which is of a high precision but still allows an effective utilization of the human sense of vision.

Even if, on the other hand, an improvement has achieved an enlarged storage capacity of the IC card, the thereby increased number of the data for the high precision recognition might bring about still another problem in that required time for displaying the stored picture data of the card is elongated, because the data have to be read out sequentially bit by bit.

TECHNICAL FIELD OF THE INVENTION

A primary object of the present invention is, therefore, to provide an individuality discriminating system which allows sufficient picture data for discriminating human individuality at a high precision to be stored in a card substantially of the same size and storage capacity as ordinary credit, cash and the like cards, the overall system arrangement to be still kept simpler and inexpensive, the discrimination reliability to be increased by enabling visual discrimination utilizable, and further the discrimination to be performable at a high speed.

According to the present invention, this object is realized by providing an individuality discriminating system which comprises means for monitoring a picture of an objective person, means for converting analog picture data from the monitoring means into digital data according to brightness of the analog picture data and compressing the digital picture data, means for writing compressed picture data into a card for use by the objective person, means for reading the compressed picture data out of the card and expanding them to convert into the analog data, and means for displaying the expanded analog picture data.

Other objects and advantages of the present invention shall become clear from the following description of the invention detailed with reference to preferred embodiments shown in accompanying drawings.

Figure 1:
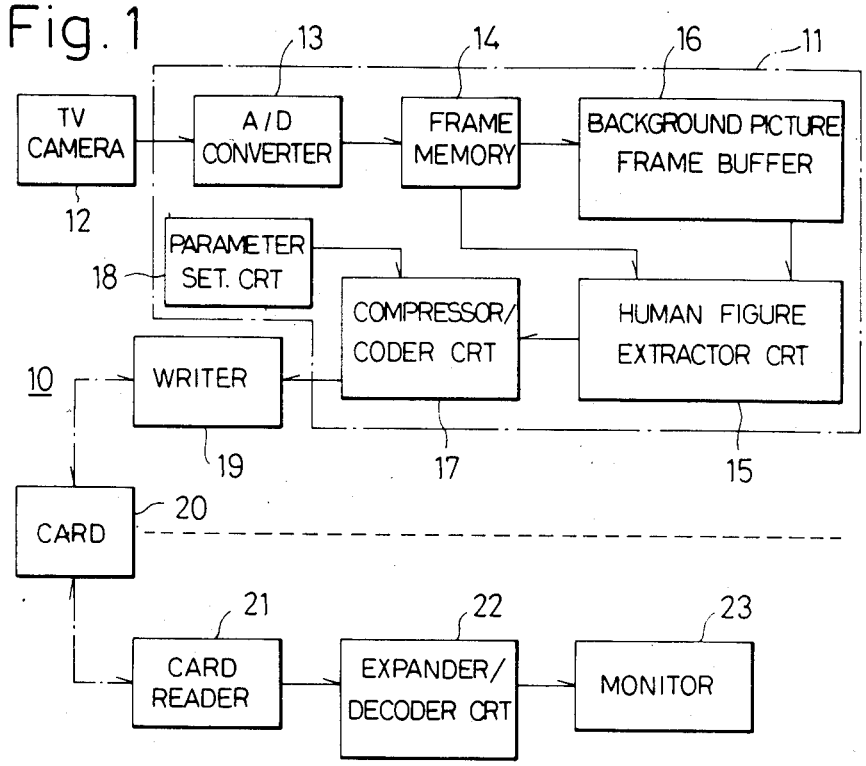
FIG. 1 is a block diagram of an individuality discriminating system according to the present invention.

While the present invention shall now be described with reference to the preferred embodiments shown in the drawings, it should be understood that the intention is not to limit the invention only to the particular embodiments shown but rather to cover all alterations, modifications and equivalent arrangements possible within the scope of appended claims.

DISCLOSURE OF PREFERRED EMBODIMENTS

Referring to FIG. 1, an individuality discriminating system 10 according to the present invention comprises a picture processing section 11 which receives picture signals from a TV camera 12 which is provided for monitoring a user of a system for recognizing the identity of every user with use of such a card as a credit card, cash card, gate-pass card for a restricted area, or the like card. The picture processing section 11 includes an A/D converter 13 which receives the picture signals directly from the TV camera 12 and converts the signals to digital signals of, for example, 6 to 8 bits in accordance with the light and shade of picture elements, i.e., brightness information of the monitored picture, and the digital signals of the picture are stored in a frame memory 14 connected to A/D converter 13.

The digital picture signals stored in the frame memory 14 are compared at a human figure extractor circuit 15 with background picture signals sent from a background picture frame buffer 16 to extract only signals indicative of such a part of the user as the face. The extracted picture signals are provided to a compressor/coder circuit 17 where the extracted picture signals are compressed, for example, two-dimensionally as will be described later, according to a compression parameter received from a parameter setting circuit 18. The extracted picture signals thus compressed are then provided from the circuit 17 to a writer 19 where, if such an IC card 20 as the credit, cash or the like card is held inserted in the writer 19 the compressed signals of the objective person, i.e., the card user, are stored on the card 20 as picture data of the bona fide card-user. The IC card 20 should be fabricated in accordance with the ISO standard (International Organization for Standardization) and may comprise a DP7816/1 or DP7816/2 incorporating memory chips.

In using the IC card 20, the user inserts the card 20 into a card reader 21 which reads the picture data stored as compressed in the card and sends them to an expander/decoder circuit 22 for their expansion and decoding. The expander/decoder circuit 22 includes a D/A converter (not shown) which converts the digital picture data to analog signals which are sent to a monitor 23, so that the picture data of the bona fide card-user will be displayed on the monitor 23, and an investigator will usually compare the thus monitored picture directly with the user's face as observed with the investigator's eyes. It will be appreciated that, even when the user changes his face expression emotionally or intentionally, the direct observation can cope with such change and the identity can be reliably investigated.

Figure 2:
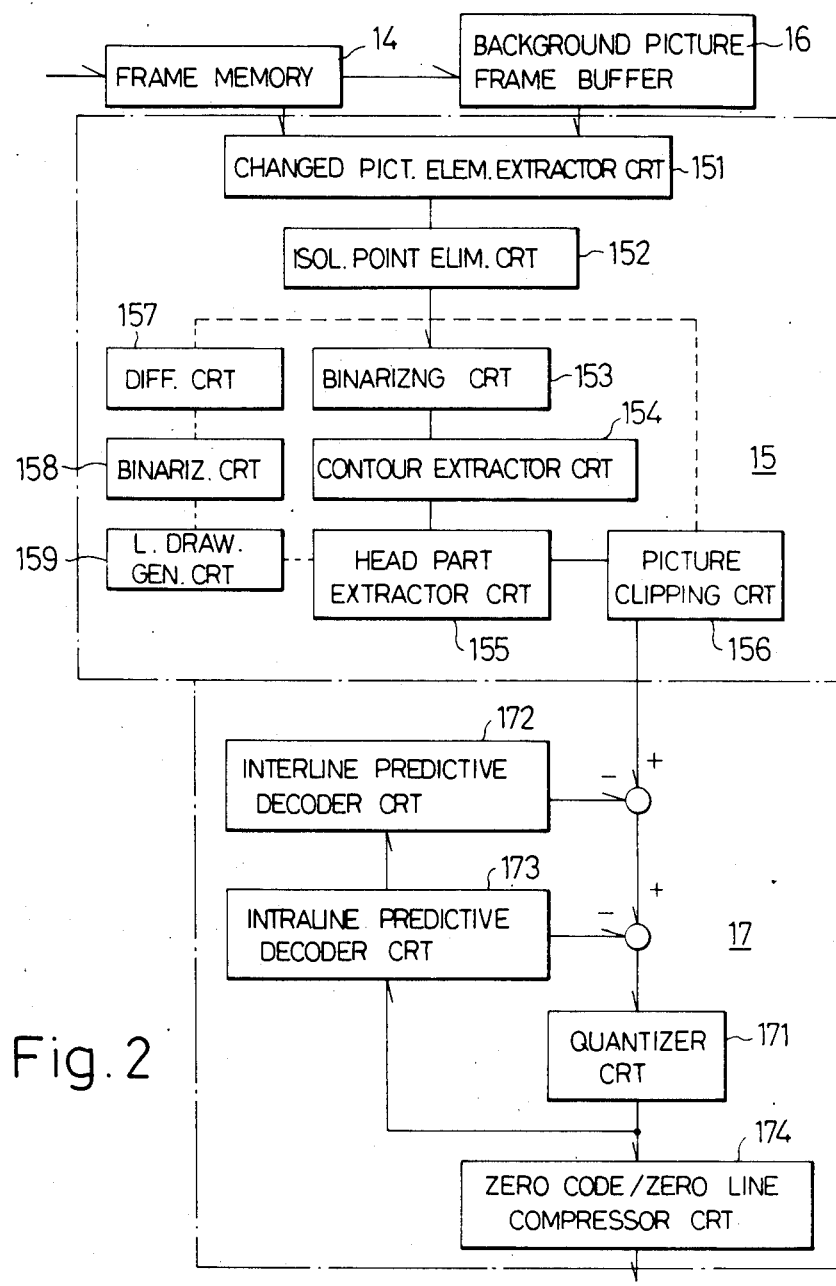
FIG. 2 is a more detailed block diagram of a human figure extractor circuit and a compressor/coder circuit in the system of FIG. 1.

The foregoing human figure extractor circuit 15 and compressor/coder circuit 17 are arranged optimumly as shown in FIG. 2, in which instance the extractor circuit 15 includes a changed picture element extractor circuit 151 which receives the signals directly from the frame memory 14 and background picture frame buffer 16. In the changed picture element extractor circuit 151, the digital picture signals of the user monitored with a predetermined background for the storage and received from the frame memory 14 is compared, with respect to every picture element, with the background picture signals of the entire predetermined background stored in advance in the background picture frame buffer 16, so as to extract such picture elements in the user's digital picture signals that are changed or largely different from a predetermined set value given to the extractor circuit 151, and only the picture signals for the user's face are generally extracted.

The thus extracted picture signals are sent to an isolated-point eliminating circuit 152 to remove any isolated point which are apt to appear on the boundary line of a small change between the user's figure and the background, within the zone of the user's figure of changed picture elements or the like position in the picture signals. After such isolated-point elimination, the picture signals are provided to a binarizing circuit 153, the picture signals binarized in the circuit 153 are sent to a contour extractor circuit 154 to clarify the contour of the user's figure by means of a conversion into a chain code or the like, and then the binarized picture signals thus clarified in the contour are provided to a head-part extractor circuit 155 to extract a picture corresponding to the user's head part as bounded by a narrower neck portion, so that only a face part in particular of the user's picture of the changed picture elements can be obtained.

Further in the human figure extractor circuit 15 of FIG. 2, the picture signals may be sent from the isolated-point eliminating circuit 152 to a picture clipping circuit 156 to clip the face part picture, so long as the extraction of the picture signals at the changed picture element extractor circuit 151 is satisfactory. The arrangement may be also made so that the picture signals from the isolated-point eliminating circuit 152 are differentiated at a differentiating circuit 157 and binarized through a binarizing circuit 158 to be binary picture signals, which are provided to a line drawing generator circuit 159 to properly divide the picture signals into regions respectively including such an individuality-featuring part as the eye, mouth or the like part, and are then sent to the head part extractor circuit 155 as well as to a picture clipping circuit 156 to obtain the face part picture, in particular, a clipped picture corresponding to one of the regions containing the individuality-featuring part.

On the other hand, the compressor/coder circuit 17 includes a quantizer circuit 171 which receives the clipped picture signals from the picture clipping circuit 156. At the previous stage of the quantizer circuit 171, an interline predictive decoder circuit 172 and an intraline predictive decoder circuit 173 are inserted to provide their outputs to the picture clipping circuit 156. In the quantizer and interline and intraline predictive decoder circuits 171, 172 and 173, other picture elements than such changed picture elements as those of the face part picture are decoded as zero picture elements, the decoding being performed reliably by, at the beginning end of the changed picture elements on each line, utilizing as predictive decoding value an interline predictive decoding value for corresponding picture elements on a previous line and, at the terminating end of the changed picture elements on the line, overshooting any zero picture element preferably to a minus value. Zero picture elements and zero codes in the light and shade of the thus obtained face picture or, in other words, its brightness information are compressed on a run length basis at a zero code/zero line compressor circuit 174 connected to the quantizer circuit 171. It will be seen that the picture data can be compressed to a remarkably reduced amount of code of only the area that the changed picture elements are occupying. In this case, the parameter setting circuit 18 shown in FIG. 1 may be included, for example, in the compressor circuit 174. For the purpose of reducing the data amount to be stored in the card, it will be also effective to elevate the compression rate only for a part of the face to be higher than that for other parts. It is preferable that, as predictive inputs of the interline predictive decoder and intraline predictive decoder circuits 172 and 173, so-called previous-value prediction (DPCM) value employed for a previous individuality discrimination, and the quantation code characteristics will be given, for example, as in a following Table:

TABLE

| (1) Code | 0 | 1 | 2 | 3 | 4 | 5 | 6 | 7 | 8 | 9 |
|---|---|---|---|---|---|---|---|---|---|---|
| (2) Time Dif. | 1 | 1 | 1 | 1 | 1 | 1 | 1 | 1 | 1 | 1 |
| (3) Amplitude Dif. | −256 | −128 | −64 | −32 | −16 | −8 | −4 | 0 | 4 | 8 |
| (4) Sample's Amplitude | below −256 | −255 to −128 | −127 to −64 | −63 to −32 | −31 to −16 | −15 to −8 | −7 to −4 | −3 to 3 | 4 to 7 | 8 to 15 |

| (1) | A | B | C | D | E |
|---|---|---|---|---|---|
| (2) | 1 | 1 | 1 | 1 | 1 |
| (3) | 16 | 32 | 64 | 128 | 256 |
| (4) | 16 to 31 | 32 to 63 | 64 to 127 | 128 to 255 | above 256 |

While the two dimensional compression has been carried out on the previous-value prediction basis in the foregoing embodiment, the compression may be also carried out by means of a so-called variable sampling rate coding. Further, instead of such two dimensional compression involving the decoding as in the foregoing embodiment, a mere single dimensional compression may be employed, in which event the quantization code characteristics may be the same as, for example, those in the above Table but, since the single dimensional compression involves no interline prediction nor decoding, the initial value of the previous picture elements on the same line, that is, the predictive decoding value for the line is used as the initial value of the changed picture elements in the foregoing embodiment. In an event where the changed picture elements change to zero elements, the arrangement should be made such that a compression code "E" which always causes the overshooting is provided to the picture elements so as to render them to be zero or a minus value and to render the minus value to be zero, whereby zero values can be treated as zero picture elements, other values than the zero values can be treated as the changed picture elements, and the zero picture elements can be compressed.

While in the foregoing embodiment of FIGS. 1 and 2 the processing is made with respect to the light and shade of the picture data, i.e., the brightness information, further, an additional processing as to color information for the picture elements will allow the individuality discrimination to be realized at a higher accuracy. In that event, the compression performed merely in the same manner as the compression based on the brightness information in the foregoing embodiments may cause a risk to arise in that a predictive error or a quantization error causes colors to drift or spread. Since colors are expressed in terms of ratios of R, G and B color components, the color information can be made to be of 2 or 3 bits for each of the R, G and B color components for being quantized and compressed to be stored in the card together with the brightness information, so that they can be expanded and decoded for reading out.

Figure 3:
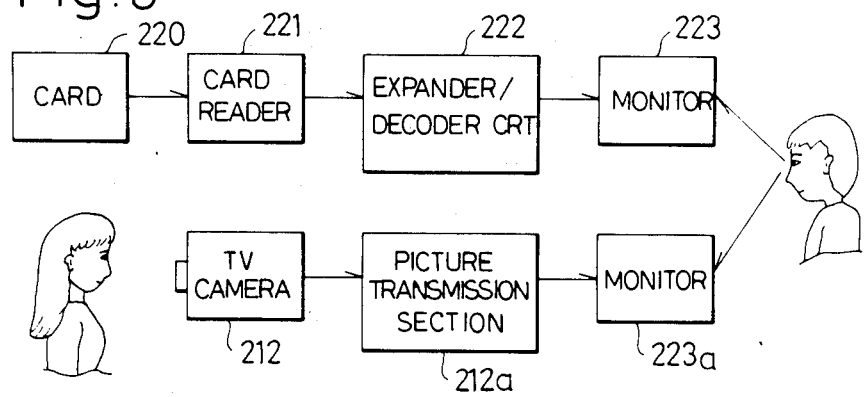
FIG. 3 is a block diagram in another embodiment of the individuality discriminating system of FIG. 1 for a remote discrimination.

According to another feature of the present invention, a remote investigation for the individuality discrimination can be realized by allowing the visual comparison to be made on two monitors. Referring to FIG. 3, there is shown another embodiment of the individuality discriminating system according to the present invention, in which substantially the same means as those in FIG. 1 are denoted by the same reference numerals but increased by 200. In the embodiment of FIG. 3, the picture data stored in an IC card 220 are displayed on a monitor 223 through a card reader 221 and an expander/decoder circuit 222, whereas the user of the IC card 220 is monitored by an investigating TV camera 212 and displayed on a monitor 223a through a picture transmission section 212a, so that the investigation can be conducted at an investigating position remote from a position of the card reader into which the user inserts the card, with a visual comparison of the two pictures on the monitors 223 and 223a at the remote investigating position.

According to the above feature, the system may be also arranged such that an operating unit operatively associated with the system and with an automatic transaction unit of a transaction system employing the credit card or a cash card is installed at the remote investigating position, so that the automatic transaction unit will be activated through the operating unit only when the investigator or an operator of the entire system discriminates the individuality of the card user through the visual comparison of the monitored pictures.

It is also possible to use the individuality discriminating system according to the present invention in association with an existing system employing known identification (ID) cards on which such specific code as the personal identification number is recorded by known magnetic means. It will be further appreciated that the individuality discriminating system of the invention based on visual comparison discrimination can be used together with any known automatic picture data comparing and discriminating system so that, when any error or false discrimination takes place in such known system, the system of the present invention can execute the individuality discrimination as a follow-up system so as to perform a double discrimination. In carrying out the visual comparison discrimination in the aspect of FIG. 3, further, the user's picture data of the changed picture elements can be displayed in place of a part of, or as embedded in, a standard or predetermined background picture preliminarily stored in the expander/decoder circuit, upon expansion and decoding of the changed picture elements forming the user's picture, as will be readily appreciated.

Yet according to the present invention, the preparation of the card involving such characteristic compressing arrangement as has been referred to, makes it possible to effectively prevent any forgery of the card from being performed.

What is claimed as our invention is:

1. An individuality discriminating system comprising means for monitoring an individual, means connected to said monitoring means for digitizing an analog picture from the monitoring means into digital picture data in accordance with brightness of said analog picture and compressing, for further processing, picture elements of said digital picture data which are changed from predetermined picture elements, any other picture elements which show no such change being compressed as zero picture elements, means for writing said compressed picture data on a card to be used by said individual, means for reading said picture data off of said card through expansion and analog conversion of the compressed data, and means connected to said reading means for displaying said data.

2. A system according to claim 1, wherein said changed picture elements are of a human figure of the individual in said picture data and said other picture elements are of a background in the data.

3. An individuality discriminating system comprising means for monitoring an individual, means connected to said monitoring means for digitizing an analog picture from the monitoring means into digital picture data in accordance with associated brightness of said analog picture and compressing picture elements of said digital picture data which are changed from predetermined picture elements, any other picture elements which shown no such change being compressed as zero picture elements, means for writing said compressed picture data on a card to be used by said individual, means for reading said picture data off of said card through expansion and analog conversion of the compressed data, and means for displaying said expanded analog picture, said digitizing and compressing means clips a face picture of the individual from said picture data.

4. A system according to claim 3, wherein said digitizing and compressing means further clips part of said face picture and compresses said clipped face part at a compression rate higher than that of other parts.

* * * * *